(12) United States Patent
Wernersson et al.

(10) Patent No.: US 9,031,148 B2
(45) Date of Patent: May 12, 2015

(54) RADIO BASE STATION AND METHOD FOR LIMITING THE UPWARD TILT OF BEAMFORMED SIGNALS

(75) Inventors: Niklas Wernersson, Solna (SE); Svante Bergman, Hägersten (SE); George Jöngren, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 392 days.

(21) Appl. No.: 13/520,639

(22) PCT Filed: Mar. 2, 2012

(86) PCT No.: PCT/SE2012/050239
§ 371 (c)(1),
(2), (4) Date: Jul. 5, 2012

(87) PCT Pub. No.: WO2013/129984
PCT Pub. Date: Sep. 6, 2013

(65) Prior Publication Data
US 2013/0229980 A1    Sep. 5, 2013

(51) Int. Cl.
*H04B 7/04* (2006.01)
*H04B 7/06* (2006.01)

(52) U.S. Cl.
CPC ............ *H04B 7/0456* (2013.01); *H04B 7/0695* (2013.01)

(58) Field of Classification Search
CPC .. H04B 7/06; H04B 7/0686; H04B 7/060617; H04B 7/0639; H04B 7/0695; H04B 7/0697
USPC .......................................... 370/328; 375/267
See application file for complete search history.

(56) References Cited

U.S. PATENT DOCUMENTS

| | | | |
|---|---|---|---|
| 2004/0162115 A1* | 8/2004 | Smith et al. | 455/562.1 |
| 2010/0273498 A1* | 10/2010 | Kim et al. | 455/450 |
| 2011/0103504 A1* | 5/2011 | Ma | 375/267 |
| 2011/0249637 A1 | 10/2011 | Hammarwall et al. | |
| 2011/0249713 A1* | 10/2011 | Hammarwall et al. | 375/220 |
| 2011/0305263 A1* | 12/2011 | Jöngren et al. | 375/219 |
| 2012/0281783 A1* | 11/2012 | Cheng et al. | 375/295 |

(Continued)

FOREIGN PATENT DOCUMENTS

| | | | | |
|---|---|---|---|---|
| EP | 2555445 A1 * | 6/2013 | | H04B 7/06 |
| WO | 2007076895 A1 | 7/2007 | | |

(Continued)

*Primary Examiner* — Benjamin Lamont
(74) *Attorney, Agent, or Firm* — Murphy, Bilak & Homiller, PLLC

(57) ABSTRACT

Embodiments herein relate to a method in a radio base station (12) for transmitting a data signal to a user equipment (10) in a radio communications network. The radio base station (12) is connected to an active antenna array of a number of active transmitting antennas and the radio base station (12) serves the user equipment (10) in the radio communications network. Each active transmitting antenna comprises sub elements. The radio base station (12) transforms a precoded data signal using a transformation, which transformation directs signals vertically. Furthermore, the radio base station (12) transmits the transformed data signal over at least one sub element to the user equipment (10). The transmitted data signal is enabled to be directed vertically, and the transformed data signal is limited to be transmitted in a direction within a range of elevation angles.

26 Claims, 10 Drawing Sheets

(56) References Cited

U.S. PATENT DOCUMENTS

2013/0176887 A1* 7/2013 Seo et al. .................. 370/252
2013/0295944 A1* 11/2013 Saur et al. .................. 455/450

FOREIGN PATENT DOCUMENTS

| WO | 2007091024 A1 | 8/2007 |
| WO | 2010050874 A1 | 5/2010 |

* cited by examiner

RADIO BASE STATION AND METHOD FOR LIMITING THE UPWARD TILT OF BEAMFORMED SIGNALS

TECHNICAL FIELD

Embodiments herein relate to a radio base station and a method therein. In particular, embodiments herein relate to transmit a data signal to a user equipment in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications (GSM)/Enhanced Data rate for GSM Evolution (EDGE), Worldwide Interoperability for Microwave Access (WiMax), or Ultra Mobile Broadband (UMB), just to mention a few possible technologies. A radio communications network comprises radio base stations providing radio coverage over at least one respective geographical area forming a cell. User equipments are served in the cells by the respective radio base station and are communicating with respective radio base station. The user equipments transmit data over an air interface to the radio base stations in uplink (UL) transmissions and the radio base stations transmit data to the user equipments in downlink (DL) transmissions.

Multi-antenna techniques may significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. For instance there is in LTE-Advanced support for a spatial multiplexing mode with possibly channel dependent precoding. The spatial multiplexing mode is aimed for high data rates in favorable channel conditions. An illustration of the spatial multiplexing operation is provided in FIG. 1. An information carrying symbol vector s is multiplied by an '$N_T \times r$' precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. The precoded signals are then Inverse Fast Fourier Transformed (IFFT).

In this way, spatial multiplexing is achieved since multiple symbols may be transmitted simultaneously over the same time/frequency resource element (TFRE). The number of symbols r is typically adapted to suit the current channel properties.

LTE uses Orthogonal frequency Division Multiplexing (OFDM) in the downlink, and Discrete Fourier Transform (DFT) precoded OFDM in the uplink, and hence the received $N_R \times 1$ vector $y_n$, where $N_R$ is number of receiver ports, for a certain TFRE on subcarrier n, or alternatively data TFRE number n, is thus modeled by $$y_n = H_n W_{N_T \times r} s_n + e_n$$

where $e_n$ is a noise/interference vector obtained as realizations of a random process. The precoder matrix, $W_{N_T \times r}$ may be a wideband precoder, which is constant over frequency, or frequency selective. Note that the signals above, e.g. $y_n$, may alternatively represent a signal in a time-domain. It is generally understood that signals mentioned may represent signals in other domains than in the time-frequency grid of an OFDM system.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

In closed-loop precoding for the LTE downlink, the UE transmits, based on channel measurements in the forward link (downlink), recommendations to the radio base station of a suitable precoder to use. The UE selects a precoder out of a countable and finite set of precoder alternatives, referred to as a precoder codebook. A single precoder that is supposed to cover a large bandwidth, wideband precoding, may be fed back. It may also be beneficial to match the frequency variations of the channel and instead feed back a frequency-selective precoding report, e.g. several precoders, one per subband of the large bandwidth. This is an example of the more general case of Channel State Information (CSI) feedback, which also encompasses feeding back other entities than precoders to assist the radio base station in subsequent transmissions to the UE. Such other information may include Channel Quality Indicators (CQIs) as well as transmission Rank Indicator (RI).

For the LTE uplink, the use of closed-loop precoding means the radio base station is selecting precoder(s) and transmission rank and thereafter signals the selected precoder that the UE is supposed to use.

Already Release-8, the first release, of LTE supports codebook based precoding for 2 antennas, a so called 2 Tx Codebook. Up to two layers may be transmitted, rank 1 and rank 2, thus making the precoder matrix $W_{2 \times r}$ of dimension 2×1 and 2×2, respectively. The precoder 2 Tx Codebook comprises a total of six precoders $$W_{2 \times r} \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} 1 & 1 \\ 1 & -1 \end{bmatrix}, \begin{bmatrix} 1 & 1 \\ j & -j \end{bmatrix} \right\}$$

out of which the first four precoders are seen to represent rank one and the rest rank 2.

LTE Release-10 and later supports a transmission mode for up to 8-layer spatial multiplexing for 8 Tx antenna ports using UE specific Reference Signal (RS), also referred to as a 8 Tx precoder codebook. An antenna port may not necessary correspond to a physical antenna but may also correspond to multiple antennas. Rank adaptation and possibly channel dependent precoding is also supported. UE specific RS is used for demodulation purposes and because of that the radio base station is free to use whatever precoder(s) it wants to, but it may be assisted in the determination of precoder(s) via CSI feedback from the UE that includes recommended precoder (s). For the time-frequency resource of interest, the UE selects a precoder out of a set of possible precoders in a precoder codebook. The available precoders in the precoder codebook are of a special factorized structure; a precoder may be written as a product of two matrix factors $$W_{8 \times r} = W^{(c)}_{8 \times 2k} W^{(t)}_{2k \times r}$$

$$= \begin{bmatrix} \tilde{W}^{(c)}_{4 \times k} & 0 \\ 0 & \tilde{W}^{(c)}_{4 \times k} \end{bmatrix} W^{(t)}_{2k \times r}$$

where an 8×2k conversion precoder $W_{8 \times 2k}^{(c)}$ strives for capturing wideband/long-term properties of the channel such as correlation while a 2k×r tuning precoder $W_{2k \times r}^{(t)}$ targets frequency-selective/short-term properties of the channel. Together they form the overall precoder $W_{g \times r}$ which together with an input symbol vector $s_{r \times 1}$ produces an output signal $x_{8 \times 1} = W_{8 \times r} s_{r \times 1}$ for r layers. The parameter k is in LTE taken to be equal to four for rank 1 and 2. Further details concerning the LTE codebook are found in 3GPP TS 36.213 V10.4.0, "Evolved Universal Terrestrial Radio Access (E-UTRA); Physical layer procedures" section 7.2 and 3GPP TS 36.211 v10.3.0 section 6.3.4.2.3.

In order for the UE to generate feedback regarding the current channel conditions a set of pre-defined channel state information reference signals (CSI-RS) may be transmitted from the radio base station to the user equipment. Based on the CSI-RS, the UE can estimate the channel and consequently also figure out which precoder suits the particular channel. For the purpose of CSI feedback determination, the UE assumes that each of the rows in $x_{8 \times 1}$ corresponds to an antenna port, ports 15-22, on which a CSI-RS is transmitted. The first row represents antenna port 15, second row antenna port 16 and so on. Each CSI-RS is typically transmitted from an antenna of its own, meaning that there is a direct correspondence between an antenna port and a physical antenna.

The design target of the 8 antenna-port LTE codebook was an 8 Tx antenna array with either four closely spaced crosspoles or eight closely spaced co-poles placed in a uniform and linear fashion. For the former case the first four rows of $W_{8 \times 2k}^{(c)}$ will target a first polarization (they are all co-polarized) and the remaining four antennas target a polarization orthogonal to the former polarization. Due to the structure of $W_{8 \times 2k}^{(c)}$, beamforming is conducted separately for each polarization followed by precoding between polarizations. For the case of eight co-poles, all the eight rows of matrix $W_{8 \times 2k}^{(c)}$ will be used to perform beamforming in one polarization. Beamforming is achieved by controlling phase and relative amplitude of the signal at each active transmitting antennas by combining elements in an antenna array in a way where signals at particular angles experience constructive interference and while others experience destructive interference.

Antenna Arrays

On the network side, radio base stations are often equipped with multiple antennas to be used for reception and transmission. The antennas intended for a cell, and/or a sector, form a so-called antenna array. Some typical antenna array constellations are illustrated in FIGS. 2(a)-(b). For instance, one common antenna array layout is to use co-polarized antennas in order to construct antenna arrays as shown in FIG. 2(a). Furthermore, another common layout is to instead use cross-polarized antennas as shown in FIG. 2(b). FIG. 2(a) shows 1 Tx, 2 Tx and 4 Tx co-polarized antenna arrays and FIG. 2(b) shows 2 Tx, 4 Tx and 8 Tx cross-polarized antenna arrays. Using for instance a 2 Tx cross-polarized antenna array, e.g. the top most antenna setup in FIG. 2(b), implies that the antenna array is fed with two signals, $x_1$ and $x_2$.

This is illustrated in FIG. 3 where it has been assumed that a 2 Tx antenna array is used with codebook based precoding and thus $x_{2 \times 1} = W_{2 \times r} s_{r \times 1}$. An example of a codebook $W_{2 \times r}$ was presented above. Thus, FIG. 3 shows an illustration of codebook based precoding based with a 2 Tx cross-polarized antenna array.

Active Antennas or Active Transmitting Antenna

An active antenna array comprises a number of sub elements or small physical devices that jointly form the active transmitting antenna. In FIG. 4(a) a sub element, in practice realized by a small physical device, is illustrated. Each sub element will have a polarization direction which potentially may be orthogonal to another sub element's polarization. This is illustrated in FIG. 4(b) where a sub element with orthogonal polarization compared to the sub element in FIG. 4(a) is shown. Finally, in FIG. 4(c) an active antenna array which comprises $N_C$ sub elements is shown. In general, but not necessarily, all the sub elements of an active transmitting antenna of an active antenna array are of the same polarization. Note that each given sub element j can be fed the given signal $x^{(j)}$ not necessarily equal to $x^{(i)}$, which is a signal for the active transmitting antenna i. Thus, FIG. 4(a) shows a sub element; FIG. 4(b) shows a sub element in the polarization orthogonal to the polarization of the sub element in FIG. 4(a); and FIG. 4(c) shows sub elements 1 . . . $N_C$ of an active antenna array comprising a active transmitting antenna i=1.

In this document, when dealing with more than one active transmitting antenna, we will adopt the notation $x_i^{(j)}$ when referring to a signal, or function, related to the j:th sub element in the i:th active transmitting antenna. These indexes will however be omitted when it is clear from the context what is being referred.

By combining two active antennas of different polarizations, as illustrated in FIG. 5(a), a 2 Tx antenna array may be created and fed with two different signals, $x_1$ and $x_2$ where $x_i = [x_i^{(1)} \ldots x_i^{(N_C)}]^T$, where i is the active transmitting antenna, and $N_C$ is the sub elements of the active transmitting antenna. Furthermore, by combining multiple 2 Tx antenna arrays, as illustrated in FIG. 5(b), an 8 Tx antenna array can be created. Here the signals $x_{j2}^{(j1)}$ are no longer explicitly shown but they are still assumed to be present in the same manner as in FIG. 5(a). FIG. 5(a) thus depicts a 2 Tx active antenna array and FIG. 5(b) depicts an 8 Tx active antenna array.

Existing precoder codebooks in different standards have been designed for conventional antenna arrays. In for instance LTE Release 10 and beyond, precoder codebooks for 2, 4 or 8 Tx antenna ports are supported. There is thus a precoder codebook suitable for each antenna array type. Hence, when using for instance a 2 Tx antenna array the standard supports the use of the 2 Tx codebook meaning that $x_1$ and $x_2$ can be fed to the antenna array just as in FIG. 3.

An active antenna array comprises many sub elements and arrays of active antennas comprise even more. Such antenna setups were neither thought of, nor taken into account, when the existing codebooks were designed. Therefore, existing precoder codebooks do not utilize the fact that the sub elements can be accessed and fed with a signal as illustrated in FIG. 5. Today, there exists no manner to use an active antenna array of a number of active transmitting antennas for transmitting data signals in an efficient and reliable manner.

SUMMARY

An object of embodiments herein is to enable an efficient and reliable use of an active antenna array in a radio communications network.

According to an aspect the object is achieved by a method in a radio base station for transmitting a data signal to a user equipment in a radio communications network. The radio base station is connected to an active antenna array of a number of active transmitting antennas and the radio base station serves the user equipment in the radio communications network. Furthermore, each active transmitting antenna comprises sub elements. The radio base station transforms a precoded data signal using a transformation, which transformation directs signals vertically. The radio base station then transmits the transformed data signal over at least one sub element to the user equipment, which transmitted data signal is enabled to be directed vertically. The transformed data signal is further limited to be transmitted in a direction within a range of elevation angles.

By limiting the transformed data signal within the range of elevation angles, energy of the data signal may be controlled and reduction of interference towards other cells is achieved. Thereby, the use of the active antenna array for directing data signals vertically, or in other words beamforming data signals in an elevation direction, is provided in an efficient and reliable manner.

According to another aspect the object is achieved by a radio base station for transmitting a data signal to the user equipment in the radio communications network. The radio base station is configured to connect to an active antenna array of a number of active transmitting antennas and configured to serve the user equipment in the radio communications network. Furthermore, each active transmitting antenna of the active antenna array comprises sub elements. The radio base station comprises a transforming circuit configured to transform a precoded data signal using a transformation, which transformation directs signals vertically. The radio base station further comprises a transmitter configured to transmit the transformed data signal over at least one sub element to the user equipment, which transmitted data signal is enabled to be directed vertically. The radio base station is configured to limit the transmission of the transformed data signal in a direction within a range of elevation angles.

Some embodiments herein further deal with restricting up-tilt and exploiting existing codebook based precoder feedback purely designed and intended for precoding in the horizontal plane for a certain number of Tx antennas to assist in precoding signals for an active antenna array with a different number of Tx antennas.

BRIEF DESCRIPTION OF THE DRAWINGS

Embodiments will now be described in more detail in relation to the enclosed drawings, in which.

DETAILED DESCRIPTION

Figure 6:
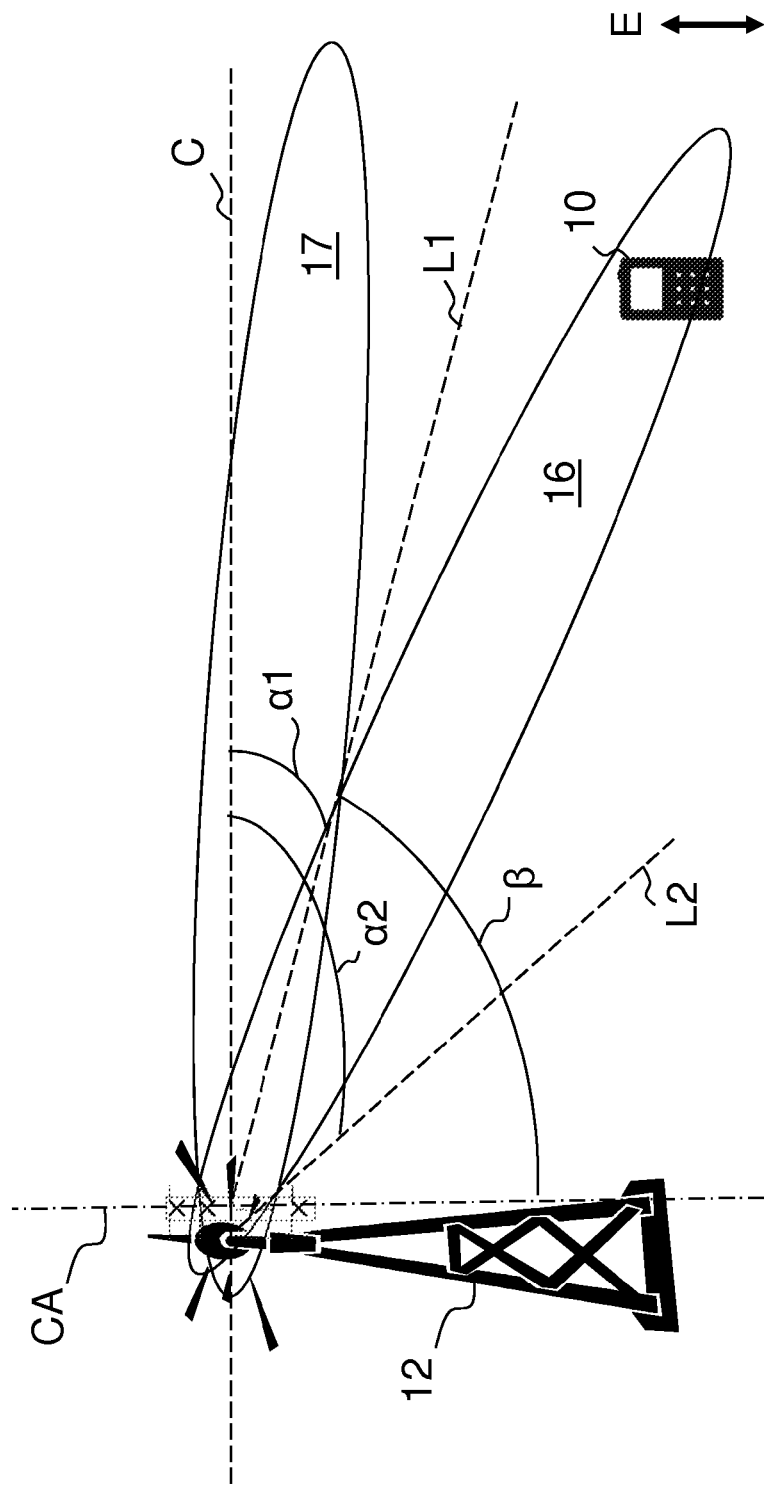
FIG. 6 is a schematic overview depicting a radio communications network according to embodiments herein.

FIG. 6 is a schematic overview depicting embodiments in a radio communications network. In today's radio communications networks a number of different technologies are used, such as LTE, LTE-Advanced, WCDMA, GSM/EDGE, WiMax, or UMB, just to mention a few possible implementations. The radio communications network comprises a radio base station 12 providing radio coverage over at least one geographical area forming a cell. The cell definition may also incorporate frequency bands used for transmissions, which means that two different cells may cover the same geographical area but using different frequency bands. A user equipment 10 is served in the cell by the radio base station 12 and is communicating with the radio base station 12. The user equipment 10 transmits data over an air or radio interface to the radio base station 12 in uplink (UL) transmissions and the radio base station 12 transmits data over an air or radio interface to the user equipment 10 in downlink (DL) transmissions.

According to embodiments herein the radio base station 12 comprises an active antenna array of a number of transmitting (Tx) antennas, which active transmitting antenna comprises a number of sub elements. The sub elements may be cross polarized relative one another and arranged along a vertical axis or vertically. The radio base station 12 transforms a precoded data signal using a transformation, which transformation directs signals vertically. This may be done by transforming data signals that have been precoded using a precoder, which precoder diversifies the data signal in an azimuth domain, and the transformation redirects the precoding signals vertically. The radio base station 12 then transmits the transformed data signal over at least one sub element to the user equipment 10. The transformed data signal is limited to be transmitted in a direction within a range of elevation angles. An elevation angle may be defined in relation to a centre plane or a centre axis C of a sub element transmitting the transformed data signal. The range may e.g. be between 10°-75° from the centre axis or a horizontal line of the active antenna array or of a sub element over which the data signal is transmitted. Thus, the interval of elevation angles may reach between a lower angle α1 and an upper angle α2. The lower angle α1 may be set to restrict an up-tilt of the transformed data signal along a first line L1 thereby reducing or omitting energy interfering transmissions at a neighbouring radio base station. The upper angle α2 may be set along a second line L2. It should be understood that the upper angle α2 may not be set at all and the interval may be defined solely on the lower angle α1. The radio base station 12 may transmit the data signal or actually a number of data signals forming a beam 16 towards the user equipment 10, avoiding transmitting an up-tilted beam 17, which would likely interfering transmissions in a neighbouring cell. It should be understood that the elevation angle may alternatively be defined in relation to a centre axis CA of the active antenna array, denoted as β in the FIG. 6. Then the threshold or the end/top angle in the range, e.g. to the first line L1, would be a high elevation angle value that would limit the data signal towards other cells. E.g., the range may stretch from 0-85°.

Thus, the radio base station 12 may diversify and direct, or beamform, data signals vertically or along an elevation axis, denoted 'E' in the FIG. 6, towards the user equipment 10 based on feedback from the user equipment 10. Hence, the transmitted data signal is enabled to be directed vertically with an increased received signal strength at the UE and a reduced interference towards neighbouring cells.

Embodiments herein inform the user equipment 10 to decide feedback and e.g. precoder to use on reference signals or reference beams for elevation beamforming with an up tilt restriction. This may be performed during configuration of the user equipment 10. Thereby embodiments avoid that this choice is made on an opportunistic basis only taking into account the impact on a single link from the radio base station 12 to the user equipment 10. Thus, embodiments herein avoid that beams are selected which seem to maximize the performance of the link but is harmful to the performance of the entire system. Beams may be selected with sufficient down-tilt so that not too much transmitted energy leaks into other cells and causes interference.

The radio base station 12 may limit which precoders the user equipment 10 may select from the configured precoder codebook so as to avoid transmitting energy in directions with too little down-tilt. The radio base station 12 may for example use a mechanism of codebook subset restriction to forbid the user equipment 10 to report precoders in the codebook which lead to signals or beams directed too much upwards. A threshold level, or a top angle, in the angular domain, herein called elevation angle domain, could be used to exclude precoders whose main data signal or beam is considered to be pointing too much upwards. The phase and amplitude over the sub elements defines the elevation angle and thus the chosen precoder will also affect the resulting elevation angle. A good rule of thumb may be to set the threshold level or a lower/top angle of a range of elevation angles so that the beams or data signals do not point above an optimized beam direction of a fixed beam solution that would have been used when active antennas are not used. An indexed ordering of the precoders in the precoder codebook may be introduced, and the user equipment 10 may be configured to exclude certain precoders from the allowed set of precoders when reporting feedback. E.g. when Discrete Fourier Transform (DFT) based precoders are used an ordering of the precoders may be introduced, and precoders after or before a certain precoder may be excluded from an allowed subset of precoders that the user equipment 10 may report, so as to avoid excessive overhead by explicitly specifying the subset restriction for each precoder.

The threshold level or end angle of the range of elevation angles may also be made dependent on the system load; a low system load would allow beams pointing more upwards, and the opposite is true for the case of higher system load. In general, use of directions with less down-tilt should be more limited the higher the system load is.

Vertically or vertical direction is defined as aligned with a gradient of the gravity field, i.e., with the direction of the gravitational force at a position of the user equipment 10. The vertical axis being an axis aligned with a normal to a surface plane of the radio base station 12 or the user equipment 10.

Although the description is mainly given for UE, it should be understood by the skilled in the art that "UE" is a non-limiting term which means any wireless device or node e.g. Personal Digital Assistant (PDA), laptop, mobile, sensor, relay, mobile tablets or even a small base station that are being positioned, i.e. a Location Server (LCS) target in general.

The radio base station 12 may also be referred to as e.g. a NodeB, an evolved Node B (eNB, eNode B), a base transceiver station, Access Point Base Station, base station router, or any other network unit capable to communicate with the user equipment 10 within the cell or cells served by the radio base station 12 depending e.g. of the radio access technology and terminology used. The radio base station 12 may also be referred to as a relay node or a beacon node.

It should here be noted that the data signal may be a part of a beam of data signals and the method applies also for a plurality of data signals.

Figure 7:
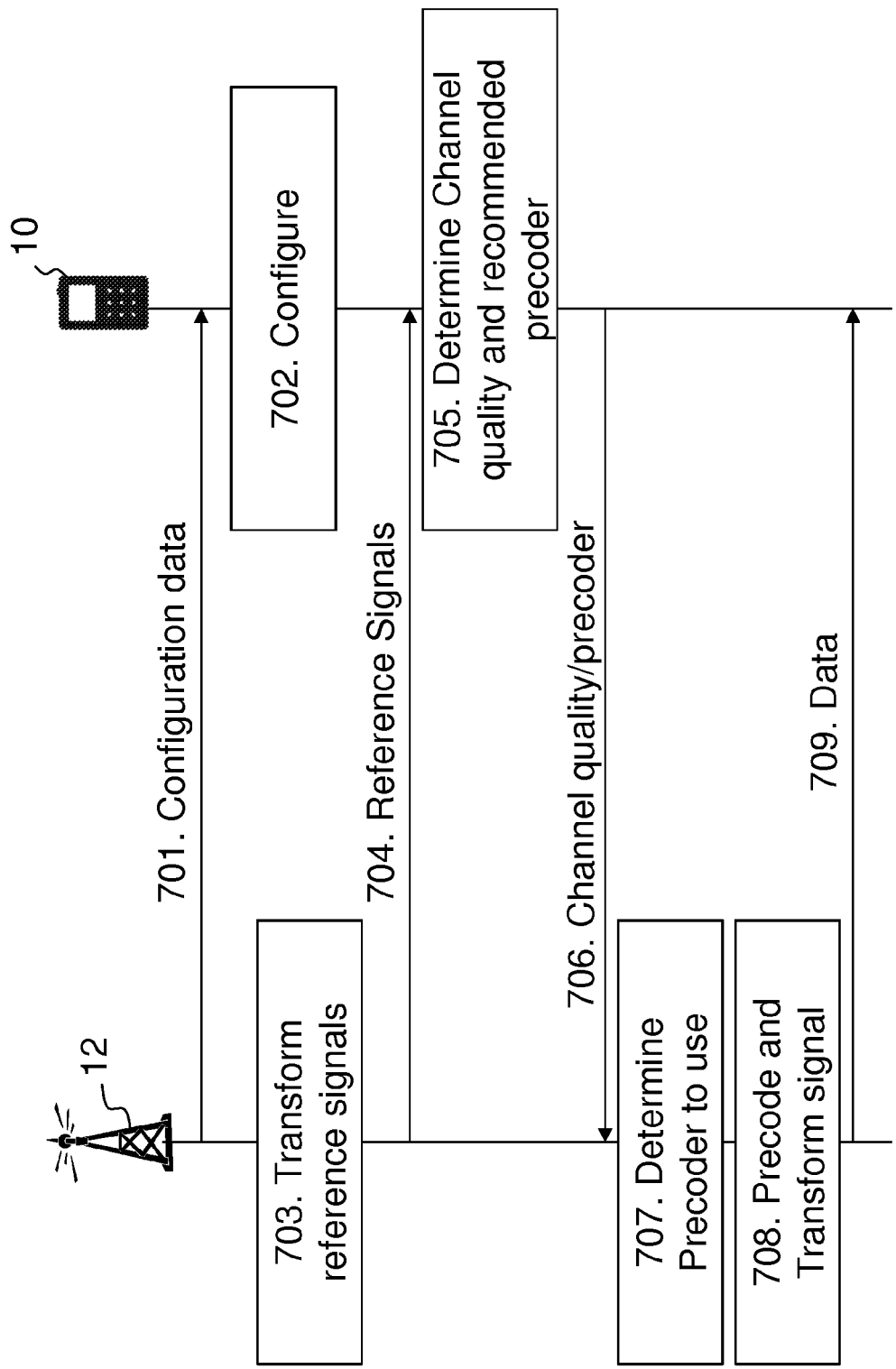
FIG. 7 is a combined flowchart and signaling scheme according to embodiments herein.

FIG. 7 is a combined flowchart and signaling scheme in the radio communications network according to some embodiments herein. The actions may be performed in any suitable order.

Action 701.

Figure 1:
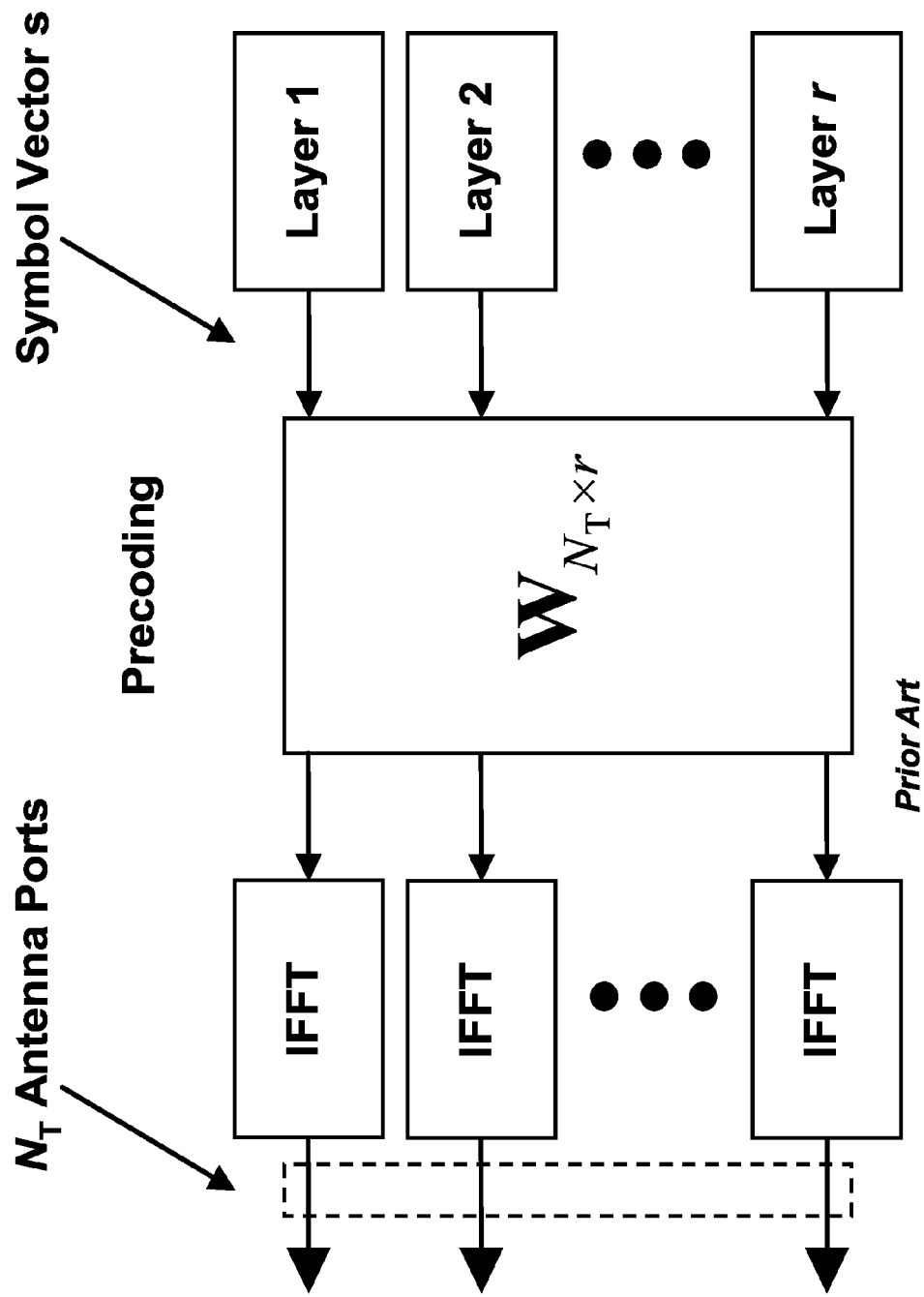
FIG. 1 is a transmission structure of precoded spatial multiplexing mode in LTE.
Figure 2:
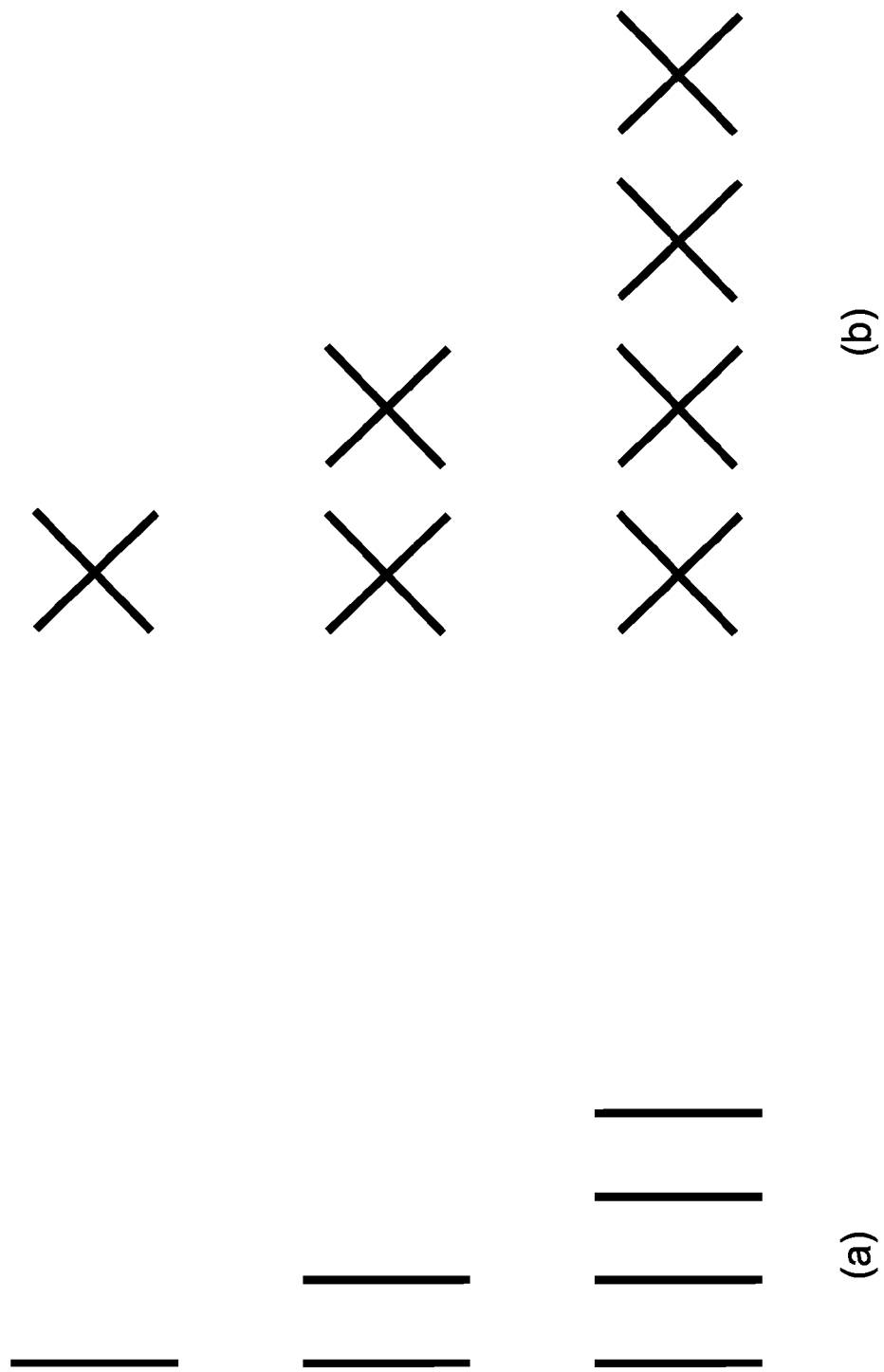
FIGS. 2a-b are illustrations of a number of TX antennas of different polarization.
Figure 3:
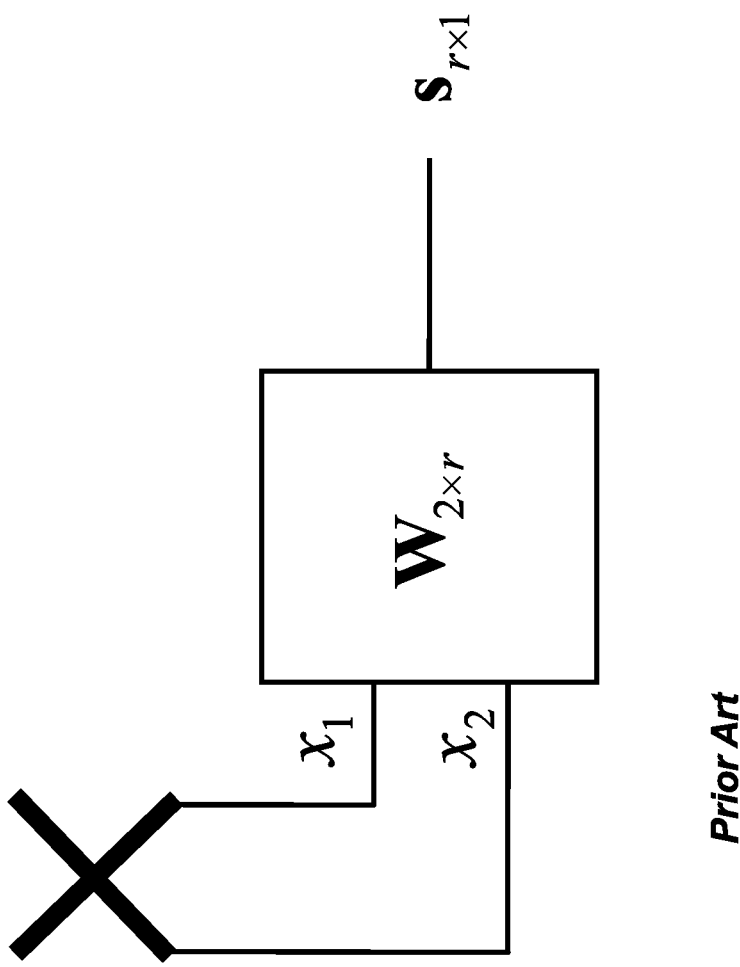
FIG. 3 is a block diagram depicting a radio base station.
Figure 4:
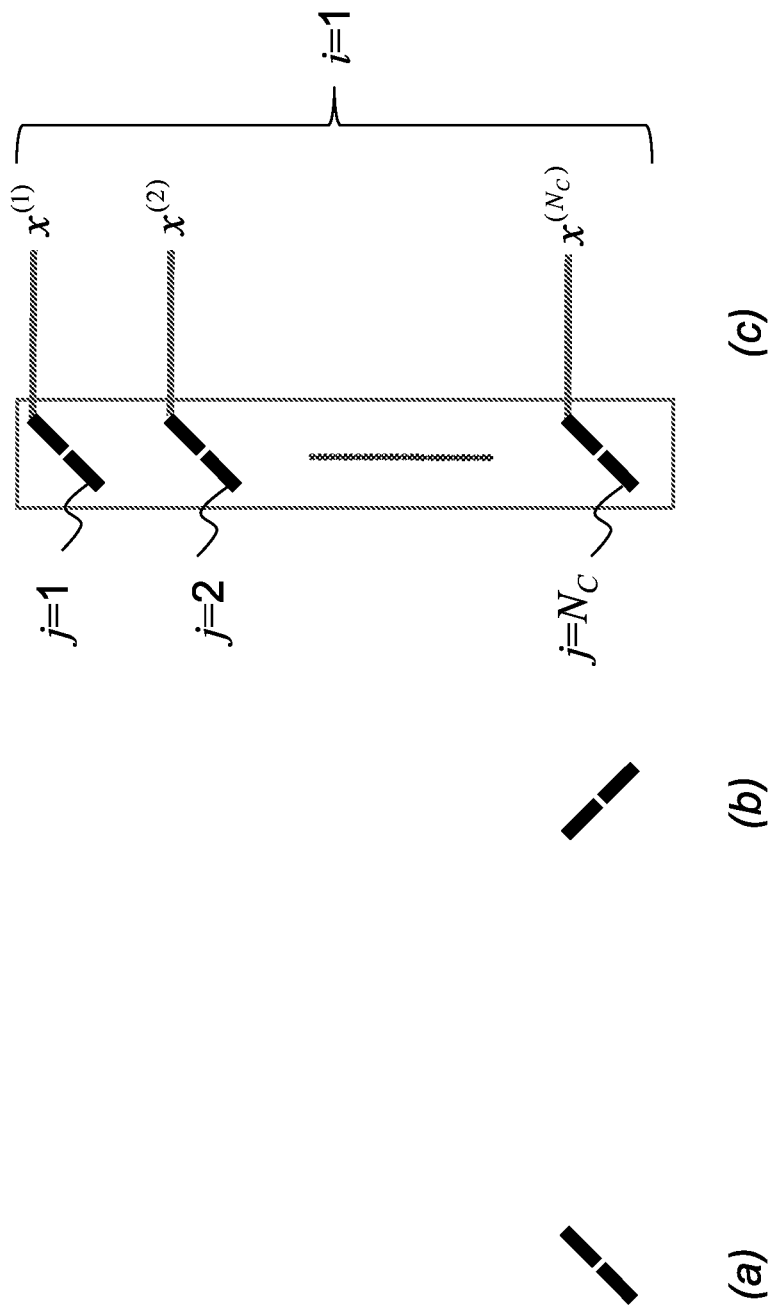
FIGS. 4a-c are illustrations of sub elements of active transmitting antennas.
Figure 5:
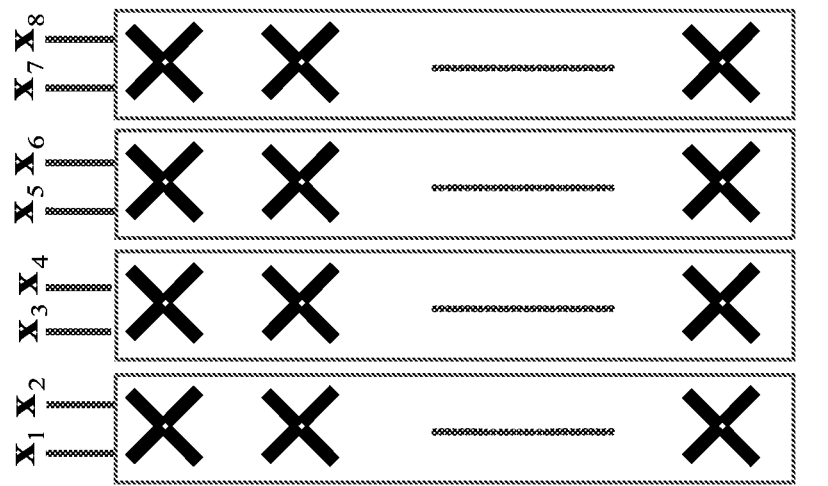
FIGS. 5a-b are illustrations of active antenna arrays of a number of active transmitting antennas.
Figure 5:
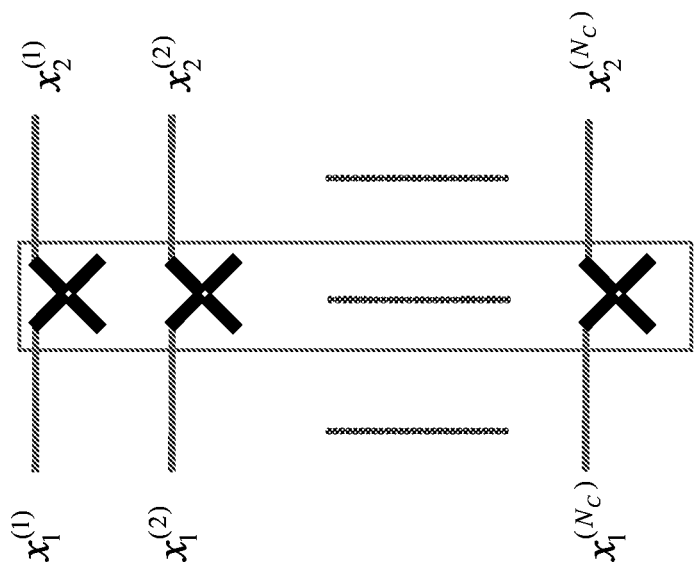

The radio base station 12 transmits configuration data to the user equipment 10 configuring which precoder codebook is used and which precoders to report feedback of. In some embodiments the radio base station 12 informs or orders the user equipment 10 to report only for a sub set of precoders in the precoder codebook in order to limit the transmissions within the range of elevation angles also known as codebook subset restriction. Some embodiments uses the elevation angle restriction when using the 8 Tx precoder codebook in LTE-Advanced with a 2 Tx, vertical, active antenna array in order to perform elevation beamforming with adjustable beams. More precisely, consider a 2 Tx antenna array as illustrated in FIG. 5(a) where each active transmitting antenna has 8 sub elements. Assume that the cross-polarized sub element pairs are placed along the vertical axis.

Now create the matrix $$B_{16 \times 8} = \begin{bmatrix} 1 & 0 & & 0 \\ 1 & 0 & & 0 \\ 0 & 1 & & 0 \\ 0 & 1 & & 0 \\ & & \ddots & \\ 0 & 0 & & 1 \\ 0 & 0 & & 1 \end{bmatrix}$$

and use the matrix to form the antenna port to sub element mapping described by $$\tilde{x}_{16 \times 1} = B_{16 \times 8} x_{8 \times 1}$$

Where it is assumed that each row in $\tilde{x}_{16 \times 1}$ correspond to one sub element and that the first 8 elements correspond to one polarization whereas the other elements correspond to the other polarization. The signal $x_{8 \times 1}$ is then created just as if the system was using the 8 Tx precoder codebook. Hence, when transmitting CSI-RS $x_{8 \times 1}$ will correspond to the CSI-RS signals produced when using the 8 Tx precoder codebook.

As can be seen from the above equations $x_{8 \times 1}$ will trough the suggested antenna port to sub element mapping transmit a signal which is beamformed in elevation. However, some of the used precoders may cause a beamforming vector with insufficient down-tilt. This is on the other hand possible to predict during the design of the system and by making use of the suggested codebook subset restriction approach these precoders may be eliminated.

Action 702.

The user equipment 10 configures itself according to the received configuration data.

Action 703.

The radio base station 12 transforms reference signals to be diversified and directed along the vertical axis or the elevation axis E. A set of reference symbols is defined in the radio base station 12. Each reference signal is then transformed and fed to a respective sub element. The transformation transforms the reference signals into a different number of signals corresponding to a number of sub elements and maps the transformed signals to the elements according to a pattern also referred to as a mapping pattern.

Action 704.

The radio base station 12 transmits the transformed reference signals to the user equipment 10.

Action 705.

The user equipment 10 determines channel quality of the different reference signals and determines e.g. a recommended precoder from the precoder codebook. Based on the reference signals, the user equipment 10 may determine a recommended transmission hypothesis, e.g. a recommended rank, a recommended precoder to use, and a Channel Quality Indicator (CQI) channel quality indicator.

Action 706.

The user equipment transmits an indicator of the determined channel quality such as a CQI, and the recommended precoder to the radio base station 12 in CSI. E.g. the user equipment 10 transmits a recommended transmission hypothesis to the base station 12. The transmission hypothesis may comprise an indicator of a recommended precoder and a channel quality indicator.

Action 707.

The radio base station 12 receives the recommended transmission hypothesis comprising e.g. the channel quality, the CQI, and the recommended precoder from the user equipment 10. Based on the received recommended transmission hypothesis, and/or a locally stored parameter, such as received transmission hypotheses from other user equipments', the radio base station 12 makes a scheduling decision where the radio base station 12 selects which precoder to use. The radio base station 12 comprises a precoder codebook for a number, $N_T$, Tx antennas or for a number, $N_T$, of active transmitting antenna ports.

Furthermore, the radio base station 12 comprises an active antenna array of an 'A' number, $N_A$, active transmitting antennas where each active transmitting antenna comprises a 'C' number, $N_C$, of sub elements. The radio base station 12 is in general not designed for precoding for the general case of ($N_A$, $N_C$). According to some embodiments herein a way to support existing precoder codebooks for a T number, $N_T$, of transmitting, Tx, antenna ports, also referred to as $N_T$ Tx codebook, and to transform the data signals for a given number of active transmitting antennas and sub elements ($N_A$, $N_C$).

Some embodiments herein reuse an existing $N_T$ Tx codebook for a 2 Tx cross-polarized active antenna array. In these exemplary embodiments, it is illustrated the use of the $N_T$ Tx precoder codebook with an active antenna array of e.g. 2 Tx antennas that are cross-polarized in order to perform elevation beamforming, despite the fact that the precoder codebook was neither designed nor intended to be used by such a 2 Tx active antenna array deployment. More precisely, consider a 2 Tx active antenna array as illustrated in FIG. 5a.

Action 708.

The radio base station 12 then precodes the data signal using the determined precoder and transforms the precoded data signal. The determined or selected precoder is actually directing the transmission of the data signal vertically as the transformation used for both the reference signals and the data signal directs the different signals vertically according to an elevation angle. Thus, the radio base station 12 directs or beamforms the data signal or signals forming a beam vertically adjustable toward the user equipment 10. As the same transformation is used for both the reference signal and the data signal, the effective channel including the transformation may be estimated by the user equipment 10 and the proper precoder may be determined. An antenna port to sub element mapping of the transformation is described in detail in FIG. 8. Furthermore, in some embodiments the transformation, instead of informing the user equipment 10 which precoders to report feedback on, the radio base station 12 may limit the direction of the data signal in the transformation. E.g. the transformation excludes directions in the transformed precoded data signal that is outside the range of elevation angles. The resulting angles from the transformation are analysed and determined in the design of such a system This is done by designing the transformation in such a way that sufficient down-tilt is always ensured, i.e. through the designed antenna port to sub element mapping. This example is described when using the 8 Tx precoder codebook in LTE-Advanced with a 2 Tx, vertical, active antenna array in order to perform elevation beamforming with adjustable beams. More precisely, consider a 2 Tx antenna array as illustrated in FIG. 5(a) where each active transmitting antenna has $N_C$ sub elements. Assume that the cross-polarized sub element pairs are placed along the vertical axis.

For the sub elements corresponding to the first polarization create four vectors of length $N_C$ $$b_q = \begin{bmatrix} b_{1,q} \\ b_{2,q} \\ \vdots \\ b_{N_C,q} \end{bmatrix},$$

$$q = 1, \ldots, 4$$

such that $b_q$ corresponds to a DFT-beamforming vector with sufficient down-tilt when applied to the sub elements. This will hence correspond to beamforming in the elevation assuming that the cross-polarized subelement pairs are placed vertically. Now create the matrix $$\tilde{B}_{N_C \times 4} = [b_1 b_2 b_3 b_4]$$

and concatenate this to form a dual polarized matrix of beamforming vectors $$B_{2N_C \times 8} = \begin{bmatrix} \tilde{B}_{N_C \times 4} & 0 \\ 0 & \tilde{B}_{N_C \times 4} \end{bmatrix}.$$

Finally, use the beamforming matrix to form an antenna port to sub element mapping described by $$\tilde{x}_{2N_C \times 1} = B_{2N_C \times 8} x_{8 \times 1}$$

where each row in $\tilde{x}_{2N_C \times 1}$ corresponds to one sub element and that the first $N_C$ elements correspond to one polarization whereas the other elements correspond to the other polarization. The signal $x_{8 \times 1}$ is then created as if the system was using the 8 Tx precoder codebook. Hence, when transmitting CSI-RS $x_{8 \times 1}$ will correspond to the CSI-RS signals produced when using the 8 Tx precoder codebook.

As can be seen from the above equations $x_{8 \times 1}$ will trough the suggested antenna port to sub element mapping transmit a signal which is beamformed by the beamforming vectors $b_q$. Since these were designed with a sufficient down-tilt the produced vector $\tilde{x}_{2N_C \times 1}$ will also get a sufficient down-tilt.

Hence, by using the 8 Tx precoder codebook designed for beamforming in azimuth domain we are able to perform elevation beamforming with a 2 Tx active antenna array based on the Release-10 LTE standard. Furthermore, this is done in such way that sufficient down-tilt is used in order not cause harmful interference to neighboring cells.

Action 709.

Figure 8:
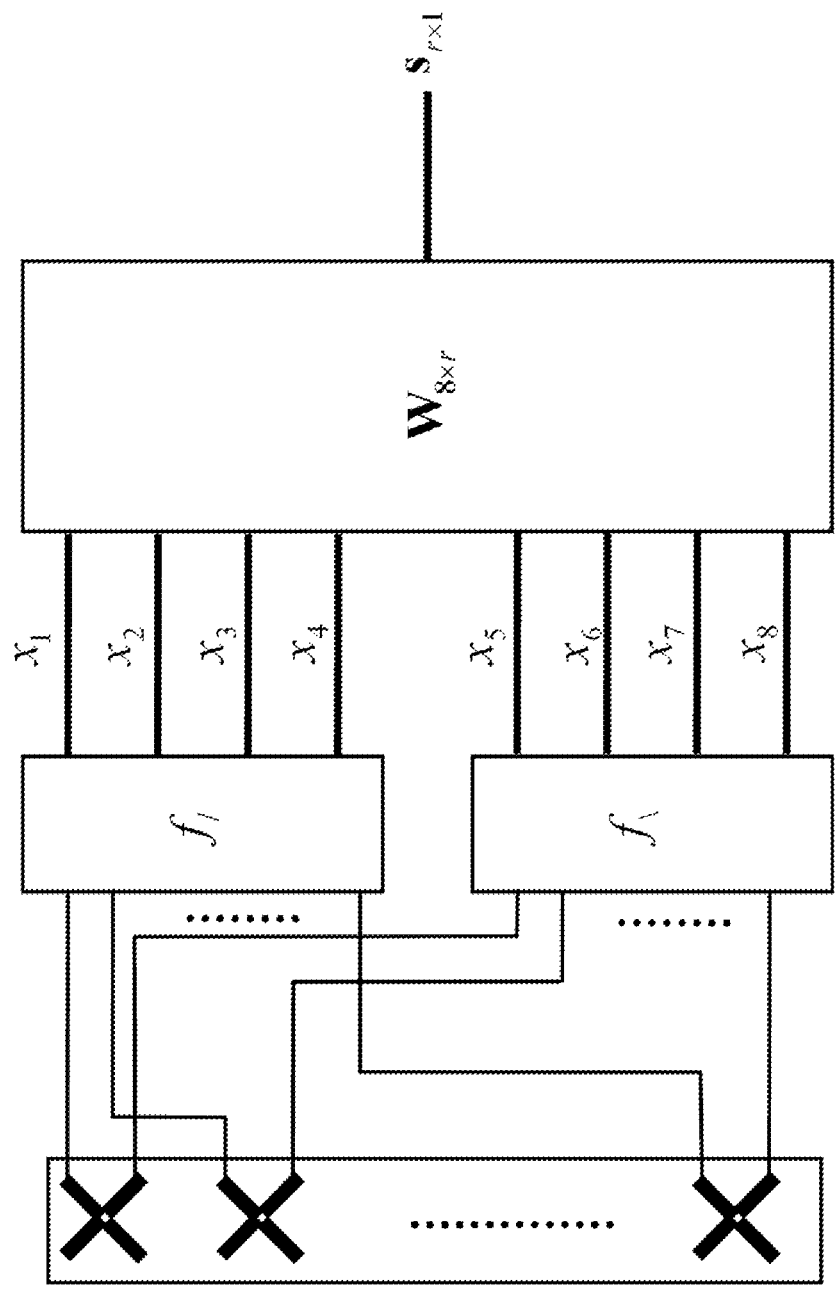
FIG. 8 is a block diagram depicting a mapping of active transmitting antenna ports to sub elements of active transmitting antennas.

The radio base station 12 then transmits the transformed data signal that is precoded using the selected precoder. Thus, the radio base station 12 comprising an active antenna array of a number of active transmitting antennas directs the data signal towards the user equipment 10, based on feedback from the user equipment 10, in a direction vertically in a reliable and efficient manner FIG. 8 is a block diagram depicting part of the transformation as a mapping of the sub elements and the active transmitting antenna ports via functions transforming the $N_T$ signals from the active transmitting antenna ports into $N_C$ signals per active transmitting antenna, thus $N_A$ active transmitting antennas times $N_C$ sub elements in total. The cross-polarized sub element pairs are placed along a vertical axis in the radio base station 12. FIG. 8 illustrates, for the case when the precoder codebook is for eight antenna ports, i.e. $N_T=8$, the placing and order of the signals $x_N$. N defines the active transmitting antenna port, and the placing and order of the signals are tied to the order for the eight antenna ports of the Channel State Information-Reference Signals (CSI-RS) in e.g. LTE. Using the proposed mapping of antenna ports together with the 8 Tx precoder codebook $$W_{8 \times r} = W^{(c)}_{8 \times 2k} W^{(t)}_{2k \times r}$$
$$= \begin{bmatrix} \tilde{W}^{(c)}_{4 \times k} & 0 \\ 0 & \tilde{W}^{(c)}_{4 \times k} \end{bmatrix} W^{(t)}_{2k \times r},$$

we have, $x_{8 \times 1} = W_{8 \times r} s_{r \times 1}$ and the first four rows of $x_{8 \times 1}$ will hence target one polarization whereas the other four rows target the orthogonal polarization.

In order to use the 8 Tx precoder codebook when using the active antenna array of two active transmitting antennas we define a active transmitting antenna port to sub element mapping for each polarization. These mappings are described by $$f_j : C^{N_T/2} \to C^{N_C}$$

$$f_k : C^{N_T/2} \to C^{N_C}$$

where C denotes the set of complex values. Hence, for each polarization there will be an $N_C$-dimensional vector $\tilde{x}_{N_C \times 1}$ produced based on the input $$x_{\frac{N_T}{2} \times 1}.$$

Furthermore, the transformation functions $f_j$ and $f_k$ define a active transmitting antenna port to sub element mapping that is used both when $x_{N_T \times 1}$ comprises data and associated reference signals. Typically, these mappings would be linear. These mappings may also be used to alter the shape of data signals or beam of data signals and also to make sure all sub elements are used in case the number of sub elements per polarization in a active transmitting antenna is larger than the number of active transmitting antenna ports, corresponding to the precoder codebook, divided by two, i.e. $N_T/2$. For example, the side lobe levels of the DFT based precoders in the 8 Tx precoder codebook may be undesirably high for elevation tilting purposes and a properly designed mapping may be helpful in alleviating that.

Hence, by using the 8 Tx codebook, solely designed and intended for beamforming in azimuth domain, embodiments herein enable elevation direction, or beamforming, with a 2 Tx active antenna array, by using a transformation comprising a mapping as described by the transformation functions $f_j$ and $f_k$ and in action 708 above.

Embodiments herein allow precoder feedback from the user equipment 10 to be used for guiding beamforming in the elevation domain for the specific user equipment 10 using active antennas in the active antenna array even if only existing codebooks that are not designed for the purpose are available. Thus, embodiments provide a solution for reusing a precoder codebook, designed for some certain purpose, in another context. This is done by some embodiments making it possible to transform signals output from a precoder codebook into signals emulating output of another precoder codebook by using a special active transmitting antenna port to sub element mapping.

Figure 9:
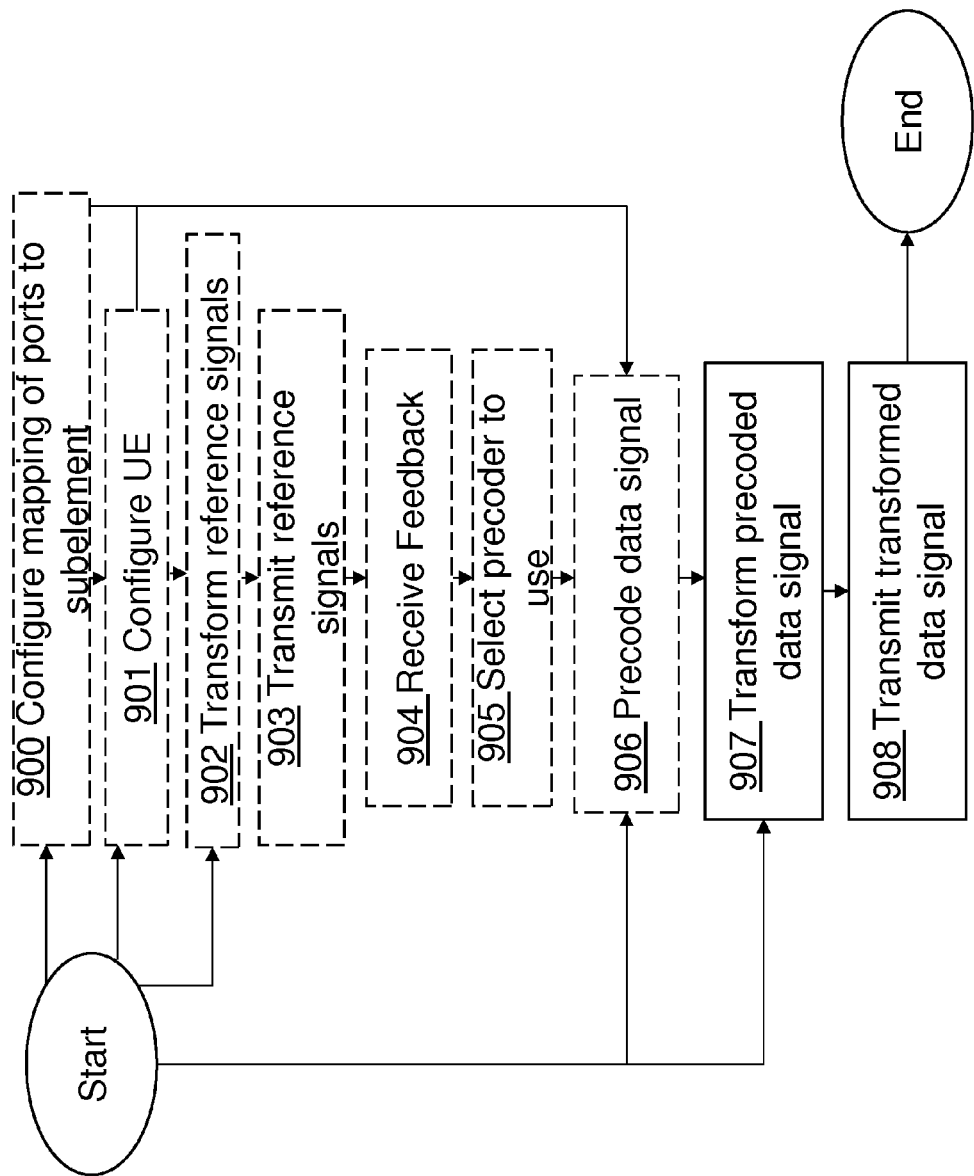
FIG. 9 is a flowchart depicting a method according to embodiments herein.

The method actions in the radio base station 12 for transmitting the data signal to the user equipment 10 in the radio communications network according to some general embodiments will now be described with reference to a flowchart depicted in FIG. 9. The actions do not have to be taken in the order stated below, but may be taken in any suitable order. Actions performed in some embodiments herein are depicted with dashed boxes. The radio base station 12 serves the user equipment 10 in the radio communications network. Furthermore, the radio base station 12 is connected to an active antenna array of, or comprising, a number of active transmitting antennas, wherein each active transmitting antenna comprises sub elements.

Action 900.

The radio base station 12 maps or the radio base station 12 is actually configured to map the number of transmission antenna ports to the sub elements of each active transmitting antenna according to a pattern. I.e., connections for data signals from the output of the precoder and reference signals to sub elements of the active antenna array are established.

Action 901.

In some embodiments, the radio base station 12 configures the user equipment to report feedback only for a subset of precoders in the precoder codebook. The subset of precoders limits the transformed data signal to be transmitted in the direction within the range of elevation angles. Also, this may be used to decrease the variation of power level transmitted to each sub element of the radio base station 12.

Action 902.

The radio base station 12 transforms reference signals using the transformation, which transformation directs the reference signals vertically. Vertically herein means that signals, any input signals, input to the transformation is separated along a vertical axis being aligned with a normal of a plane parallel with a surface of the earth. The transformation may map data signals from the number of transmission antenna ports to the sub elements of each active transmitting antenna according to the configured pattern. The signals may e.g. use the configured mapping to divert the signals vertically, wherein the mapping or pattern may have been configured in action 900 during design and analysis.

Action 903.

The radio base station 12 may transmit the transformed reference signals over the sub elements.

Action 904.

The radio base station 12 may further receive feedback, from the user equipment 10. The feedback indicates channel quality information and a recommended precoder in the precoder codebook based on the transmitted reference signals.

Action 905.

The radio base station 12 may select the precoder out of the precoders in the precoder codebook to use for the transformed data signal based on the received feedback. The selection may further rely on recommended precoders and feedback from other user equipments or similar.

Action 906.

In some embodiments the radio base station 12 precodes the data signal with a precoder from a precoder codebook. The precoder codebook comprises precoders for transmitting signals in a diversified manner over a number of transmission antenna ports. For example, the precoder codebook may be an 8 Tx Codebook for diversifying signals in the azimuth domain. In some embodiments the number of active transmitting antennas is two and the number of transmission antenna ports is eight. The precoder codebook may comprise a factorized precoder structure for eight transmission antenna ports. The factorized precoder structure may in some embodiments be decomposed into one factor having an effect of performing a beamforming, based on a Discrete Fourier Transform process, over two groups of sub elements, and another factor that has an effect of altering a relative phase of transmissions between the two groups of sub elements.

Action 907.

The radio base station 12 transforms the precoded data signal using a transformation, which transformation directs signals vertically. The transformation may limit the transformed data signal to be transmitted in the direction within the range of elevation angles. The sub elements may comprise first sub elements polarized according to a first polarization and second sub elements polarized according to a second polarization. As stated above the transformation maps data signals from the number of transmission antenna ports to the sub elements of each active transmitting antenna according to the pattern. The transformation may be separately performed for data signals for each polarization of sub elements, and thus mapped to the first and second sub elements. For example, the radio base station 12 takes a $N_T$-port of $N_T$ dimensions signal, such as CSI-RS or precoded data signal and applies the transformation. This will give an $N_C$-dimensional signal for each active transmitting antenna $N_A$, wherein $N_A \times N_C$ differs from $N_T$. The transformation further takes the $N_A \times N_C$ signal values and maps them to the $N_C$ sub elements of each active transmitting antenna according to the pattern that diversifies the transmissions of the data signal or CSI-RS. Thus, the transformation may transform precoded data signals or reference signals of a first number into a second number of signals for the sub elements, wherein the first and second numbers differ. The second number of signals are then mapped to sub elements of each active transmitting antenna.

Action 908.

The radio base station 12 transmits the transformed data signal over at least one sub element to the user equipment 10. The transmitted data signal is enabled to be directed vertically. Furthermore, the transformed data signal is limited to be transmitted in a direction within a range of elevation angles. E.g. not over an elevation angle defined from the centre axis CA of the active antenna array or not below an elevation angle defined from the, horizontal, centre axis C of a sub element. In some embodiments reference signals or data signals of four antenna ports are transmitted on the sub elements having one polarization and the reference signals or data signals of the last four antenna ports are transmitted on the remaining sub elements of a different polarization, which different polarization is orthogonal to the one polarization. As stated above the radio base station 12 may limit the direction by e.g. configuring feedback or in the transformation in actions 907 and/or 902.

In some embodiment the radio base station 12 uses the precoder selected in action 905 and then the action 907 directs the data signal vertically when transmitting the data signal.

Furthermore, by altering a transmission power of the sub elements a shape of a beam of transformed data signals may be tapered in order to further control and reduce the interference towards a neighbouring cell.

Figure 10:
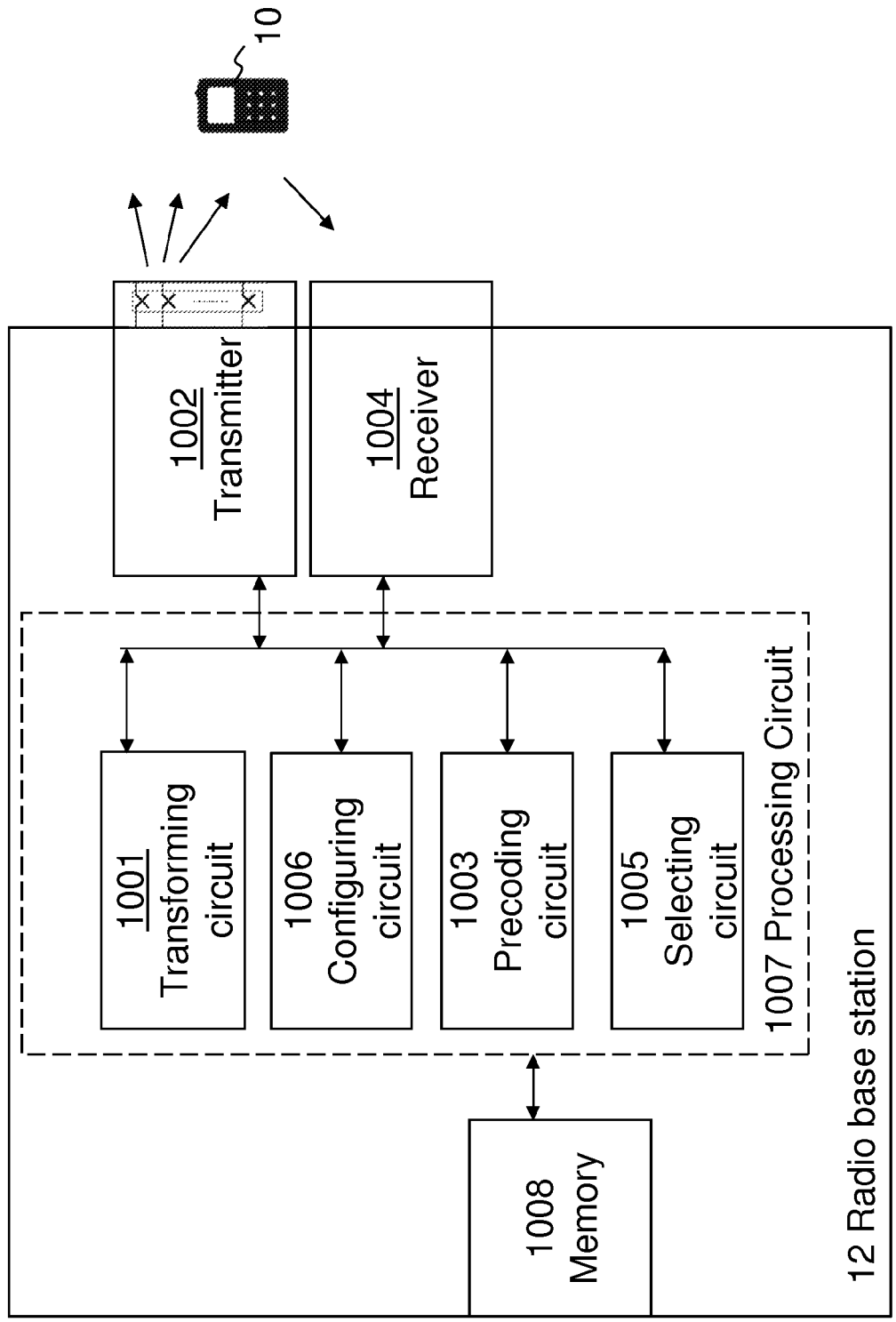
FIG. 10 is a block diagram depicting the radio base station according to embodiments herein.

FIG. 10 is a block diagram depicting a radio base station 12 for transmitting the data signal to the user equipment 10 according to some embodiment herein. The radio base station 12 is configured to connect to an active antenna array of a number of active transmitting antennas, and to serve the user equipment 10 in the radio communications network. Each active transmitting antenna comprises sub elements.

The radio base station 12 comprises a transforming circuit 1001 configured to transform a precoded data signal using a transformation, which transformation directs signals vertically.

Furthermore, the radio base station 12 comprises a transmitter 1002 configured to transmit the transformed data signal over at least one sub element to the user equipment 10. The transmitted data signal is enabled to be directed vertically, and the radio base station 12 is configured to limit the transmission of the transformed data signal in a direction within a range of elevation angles. In some embodiments the transformation is configured to limit the transformed data signal to be transmitted in the direction within the range of elevation angles.

The radio base station 12 may further comprise a precoding circuit 1003 configured to precode the data signal with a precoder from a precoder codebook. The precoder codebook comprises precoders for transmitting signals in a diversified manner over a number of transmission antenna ports. The number of active transmitting antennas may be two and the number of transmission antenna ports may be eight. The precoder codebook may comprise a factorized precoder structure for eight transmission antenna ports, and in some embodiments factors in the factorized precoder structure is decomposed into one factor having an effect of performing a beamforming, based on a Discrete Fourier Transform process, over two groups of sub elements, and another factor that has an effect of altering a relative phase of transmissions between the two groups of sub elements. For example, reference signals or data signals of four antenna ports may be transmitted on the sub elements having one polarization and the reference signals or data signals of the last four antenna ports may be transmitted on the remaining sub elements of a different polarization, which different polarization is orthogonal to the one polarization.

In some embodiments the transforming circuit 1001 is configured to map the transformed data signals to the sub elements of each active transmitting antenna according to a pattern. Thus, the transformation may transform the number of signals from the precoder, e.g. 8 signals, into a greater number, e.g. for 7 sub element for each active transmitting antenna i.e. 14 signals, and then map the transformed signals to the sub elements. The pattern may be pre-configured from an analysis analysing signals and directions during design.

In some embodiments herein, the transforming circuit 1001 is further configured to transform reference signals using the transformation, which transformation directs the reference signals vertically. The transmitter 1002 may then be configured to transmit the transformed reference signals over the sub elements.

The radio base station 12 may in some embodiments then comprise a receiver 1004 configured to receive feedback, from the user equipment 10, indicating channel quality information and a recommended precoder in the precoder codebook based on the transmitted reference signals.

The radio base station 12 may also comprise a selecting circuit 1005 configured to select a precoder out of the precoders in the precoder codebook to use for the transformed data signal based on the received feedback. The precoding circuit 1003 may then be configured to use the selected precoder, and the transmitter 1002 may be configured to transmit the data signal directed vertically towards the user equipment 10.

In some embodiments the radio base station 12 comprises a configuring circuit 1006 adapted to configure the user equipment 10 to report feedback only for a subset of precoders in the precoder codebook. The subset of precoders limits the transformed data signal to be transmitted in the direction within the range of elevation angles.

In some embodiments the sub elements comprise first sub elements polarized according to a first polarization and second sub elements polarized according to a second polarization. The transforming circuit 1001 may then be further configured to transform data signals separately for each polarization of sub elements.

The radio base station 12 may be configured to taper a beam of a number of transformed data signals by altering a transmission power of the sub elements or in the transformation.

The embodiments herein for transmitting the data signal to the user equipment 10 may be implemented through one or more processors, such as a processing circuit 1007 in the radio base station 12 depicted in FIG. 10, together with computer program code for performing the functions and/or method actions of the embodiments herein. The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

Those skilled in the art will also appreciate that the various "circuits" described may refer to a combination of analog and digital circuits, and/or one or more processors configured with software and/or firmware, e.g., stored in memory, that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Furthermore the radio base station 12 may comprise a memory 1008. The memory 1008 may comprise one or more memory units and may be used to store for example data such as threshold values, ranges of elevation angles, precoder codebooks, applications to perform the methods herein when being executed on the radio base station 12 or similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein is being defined by the following claims.

The invention claimed is:

1. A method in a radio base station for transmitting a data signal to a user equipment in a radio communications network, wherein the radio base station is connected to an active antenna array of a number of active transmitting antennas and the radio base station serves the user equipment in the radio communications network, and wherein each active transmitting antenna comprises sub elements, and the method comprises:
    precoding a data signal to obtain a precoded data signal, said precoding performed with a precoder from a precoder codebook for azimuth beamforming;
    transforming the precoded data signal to obtain a transformed data signal using a transformation that imparts elevation beamforming, said elevation beamforming restricting elevation beamforming angles such that the transformed data signal is directed no higher than a top elevation angle defined below a horizontal center axis extending from the sub elements; and
    transmitting the transformed data signal from the sub elements mapped by the transformation.

2. The method of claim 1, wherein the precoder codebook comprises precoders for transmitting signals in a diversified manner over a number of transmission antenna ports.

3. The method of claim 2, wherein the transforming further comprises mapping data signals from the number of transmission antenna ports to the sub elements of each active transmitting antenna according to a pattern.

4. The method of claim 2, wherein the number of active transmitting antennas is two and the number of transmission antenna ports is eight.

5. The method of claim 2, further comprising excluding precoders from the precoder codebook that transmit signals in a direction above the top elevation angle.

6. The method of claim 2, wherein the precoder codebook comprises a factorized precoder structure for eight transmission antenna ports, and wherein factors in the factorized precoder structure is decomposed into one factor having an effect of performing a beamforming, based on a Discrete Fourier Transform process, over two groups of sub elements, and another factor that has an effect of altering a relative phase of transmissions between the two groups of sub elements.

7. The method of claim 2, further comprising:
    transforming reference signals using the transformation, which transformation directs the reference signals vertically;
    transmitting the transformed reference signals over the sub elements;
    receiving feedback, from the user equipment, indicating channel quality information based on the transmitted reference signals, and a recommended precoder in the precoder codebook;
    selecting a precoder out of the precoders in the precoder codebook to use for the transformed data signal based on the received feedback; and
    precoding, using the selected precoder, wherein the transforming directs the data signal vertically when transmitting the data signal.

8. The method of claim 2, further comprising
    configuring the user equipment to report feedback only for a subset of precoders in the precoder codebook, wherein the subset of precoders limits the transformed data signal to be transmitted in the direction within the range of elevation angles.

9. The method of claim 1, further comprising adjusting the top elevation angle higher for lower system loads and lower for higher system loads.

10. The method of claim 1, wherein sub elements comprises first sub elements polarized according to a first polarization and second sub elements polarized according to a second polarization.

11. The method of claim 10, wherein reference signals or data signals of four antenna ports are transmitted on the sub elements having one polarization and reference signals or data signals of the last four antenna ports are transmitted on the remaining sub elements of a different polarization, wherein the different polarization is orthogonal to the one polarization.

12. The method of claim 10, wherein the transforming is separately performed for data signals for each polarization of sub elements.

13. The method of claim 1, wherein a beam of a number of transformed data signals is tapered by altering a transmission power of the sub elements.

14. A radio base station for transmitting a data signal to a user equipment in a radio communications network, wherein the radio base station configured to connect to an active antenna array of a number of active transmitting antennas, and to serve the user equipment in the radio communications network, and each active transmitting antenna comprises sub elements, and wherein the radio base station comprises:
- a precoding circuit configured to precode a data signal to obtain a precoded data signal, said precoding performed with a precoder from a precoder codebook for azimuth beamforming;
- a transforming circuit configured to transform the precoded data signal to obtain a transformed data signal using a transformation that imparts elevation beamforming, said elevation beamforming restricting elevation beamforming angles such that the transformed data signal is directed no higher than a top elevation angle defined below a horizontal center axis extending from the sub elements; and
- a transmitter configured to transmit the transformed data signal from the sub elements mapped by the transformation.

15. The radio base station of claim 14, wherein the precoder codebook comprises precoders for transmitting signals in a diversified manner over a number of transmission antenna ports.

16. The radio base station of claim 15, wherein the transforming circuit is configured to map the transformed data signals to the sub elements of each active transmitting antenna according to a pattern.

17. The radio base station of claim 15, wherein the number of active transmitting antennas is two and the number of transmission antenna ports is eight.

18. The radio base station of claim 15, wherein the precoder circuit is configured to exclude precoders from the precoder codebook that transmit signals in a direction above the top elevation angle.

19. The radio base station of claim 15, wherein the precoder codebook comprises a factorized precoder structure for eight transmission antenna ports, and wherein factors in the factorized precoder structure are decomposed into one factor having an effect of performing a beamforming, based on a Discrete Fourier Transform process, over two groups of sub elements, and another factor that has an effect of altering a relative phase of transmissions between the two groups of sub elements.

20. The radio base station of claim 15, wherein the transforming circuit is further configured to transform reference signals using the transformation, which transformation directs the reference signals vertically; and wherein the transmitter is further configured to transmit the transformed reference signals over the sub elements; and further wherein the radio base station comprises:
- a receiver configured to receive feedback, from the user equipment, indicating channel quality information based on the transmitted reference signals, and a recommended precoder in the precoder codebook; and
- a selecting circuit configured to select a precoder out of the precoders in the precoder codebook to use for the transformed data signal based on the received feedback; and
- wherein the precoding circuit is configured to use the selected precoder, and the transmitter is configured to transmit the data signal directed vertically towards the user equipment.

21. The radio base station of claim 15, further comprising a configuring circuit adapted to configure the user equipment to report feedback only for a subset of precoders in the precoder codebook, wherein the subset of precoders limits the transformed data signal to be transmitted in the direction within the range of elevation angles.

22. The radio base station of claim 14, wherein the transformation is configured to adjust the top elevation angle higher for lower system loads and adjust the top elevation angle lower for higher system loads.

23. The radio base station of claim 14, wherein sub elements comprise first sub elements polarized according to a first polarization and second sub elements polarized according to a second polarization.

24. The radio base station of claim 23, wherein reference signals or data signals of four antenna ports are transmitted on the sub elements having one polarization and reference signals or data signals of the last four antenna ports are transmitted on the remaining sub elements of a different polarization, wherein the different polarization is orthogonal to the one polarization.

25. The radio base station of claim 23, wherein the transforming circuit is further configured to transform data signals separately for each polarization of sub elements.

26. The radio base station of claim 14, wherein the radio base station is configured to taper a beam of a number of transformed data signals by altering a transmission power of the sub elements.

* * * * *